(12) United States Patent
Kraiss et al.

(10) Patent No.: US 7,373,633 B2
(45) Date of Patent: *May 13, 2008

(54) ANALYTICAL APPLICATION FRAMEWORK

(75) Inventors: Achim Kraiss, Lautertal (DE); Jens Weidner, Lelmen (DE); Marcus Dill, Wiesloch (DE); Sven Gilg, Stringer (DE); Harish Hoskere Mahabal, Bangalore (IN); Dipankar Roy, Bangalore (IN); Vikas Bhan, Bangalore (IN); Manikandan V, Bangalore (IN); Girish V. Kulkarni, Bangalore (IN); Ramine Eskandari, Heidelberg (DE)

(73) Assignee: SAP AG, Walldorf (DE)

( * ) Notice: Subject to any disclaimer, the term of this patent is extended or adjusted under 35 U.S.C. 154(b) by 751 days.

This patent is subject to a terminal disclaimer.

(21) Appl. No.: 10/454,370

(22) Filed: Jun. 3, 2003

(65) Prior Publication Data

US 2004/0250255 A1   Dec. 9, 2004

(51) Int. Cl.
 *G06F 9/44* (2006.01)
(52) U.S. Cl. .................... 717/110; 707/101
(58) Field of Classification Search ............. None
 See application file for complete search history.

(56) References Cited

U.S. PATENT DOCUMENTS

| | | | |
|---|---|---|---|
| 5,317,722 A | 5/1994 | Evans | |
| 5,603,027 A | 2/1997 | Ohkami | |
| 5,974,428 A | 10/1999 | Gerard et al. | |
| 6,216,137 B1 | 4/2001 | Nguyen et al. | |
| 6,240,411 B1 | 5/2001 | Thearling | |
| 6,460,037 B1 | 10/2002 | Weiss | |
| 6,470,333 B1 * | 10/2002 | Baclawski | 707/3 |
| 6,778,971 B1 | 8/2004 | Altschuler | |
| 6,782,390 B2 | 8/2004 | Lee | |

(Continued)

FOREIGN PATENT DOCUMENTS

WO   03/005232   1/2003

(Continued)

OTHER PUBLICATIONS

U.S. Appl. No. 10/652,872, filed Aug. 29, 2003, Kraiss et al.

(Continued)

*Primary Examiner*—Wei Zhen
*Assistant Examiner*—Phillip H Nguyen
(74) *Attorney, Agent, or Firm*—Fish & Richardson P.C.

(57) ABSTRACT

One implementation provides a computer system that integrates software applications with analytical software applications. In this implementation, the computer system is programmed to receive a request from a software application to execute an analytical task, such as a prediction task or a key performance indicator (KPI) lookup task. The request includes a task name and input information. The computer system then uses the task name to identify an analytical engine and a data store, and invokes an analytical software application in the analytical engine to execute the analytical task. The analytical task is executed using the identified data store and the received input information. The computer system receives task output from the invoked analytical software application, the task output including output information generated during execution of the analytical task. The computer system then sends the output information to the software application that made the request.

19 Claims, 12 Drawing Sheets

U.S. PATENT DOCUMENTS

| | | | |
|---|---|---|---|
| 6,820,073 | B1 | 11/2004 | Bedell |
| 6,842,751 | B1 | 1/2005 | Vilalta |
| 6,920,458 | B1 | 7/2005 | Chu |
| 6,941,301 | B2 | 9/2005 | Ferguson |
| 6,941,318 | B1 | 9/2005 | Tamayo |
| 6,954,758 | B1 * | 10/2005 | O'Flaherty .................. 707/102 |
| 7,024,417 | B1 * | 4/2006 | Russakovsky et al. ...... 707/101 |
| 2002/0051063 | A1 | 5/2002 | Hwang |
| 2002/0078039 | A1 | 6/2002 | Cereghini |
| 2003/0043815 | A1 * | 3/2003 | Tinsley et al. ......... 370/395.21 |
| 2003/0220860 | A1 | 11/2003 | Heytens |
| 2004/0098358 | A1 * | 5/2004 | Roediger ..................... 706/46 |

FOREIGN PATENT DOCUMENTS

| | | |
|---|---|---|
| WO | WO 03/037018 | 5/2003 |

OTHER PUBLICATIONS

U.S. Appl. No. 10/664,771, filed Sep. 17, 2003, Kraiss et al.

U.S. Appl. No. 10/665,249, Sep. 18, 2003, Kraiss et al.

http://www.sas.com/news/preleases/111802/news2.html—"SAS Acquires Technology to Track Customer Behavior In Real-Time," printed from the Internet Apr. 18, 2003, 2 ps.

"Welcome to The Real-Time Enterprise," PeopleSoft, Inc., Copyright 2003, 8 ps.

"DataDistilleries Real-Time Suite," DataDistilleries, Copyright 2002, 2 ps.

"DataDistilleries Analytical Suite," DataDistilleries, Copyright 2002, 2 ps.

http://www.epiphany.com/news/2002press/2002_08_27.html—E.Piphany—"E.Piphany Real-Time Wins CRM Excellence Award from Customer Inter@ction Solutions Magazine," printed from the Internet Apr. 18, 2003, 2 ps.

http://www.verilytics.com/products/index.html—"Verilytics Products," printed from the Internet Apr. 18, 2003, 2 ps.

http://www.dmg.org/faq.htm—"Frequently Asked Questions," printed from the Internet Apr. 18, 2003, 2 ps.

PowerPoint Presentation, Analytical CRM, SAP AG, 24 ps. 2001.

U.S. Appl. No. 10/633,884 (Non-final Office Action dated Nov. 21, 2006).

U.S. Appl. No. 10/633,884 (Final Office Action dated Aug. 8, 2007).

U.S. Appl. No. 10/652,872 (Non-final Office Action dated Jun. 12, 2007).

* cited by examiner

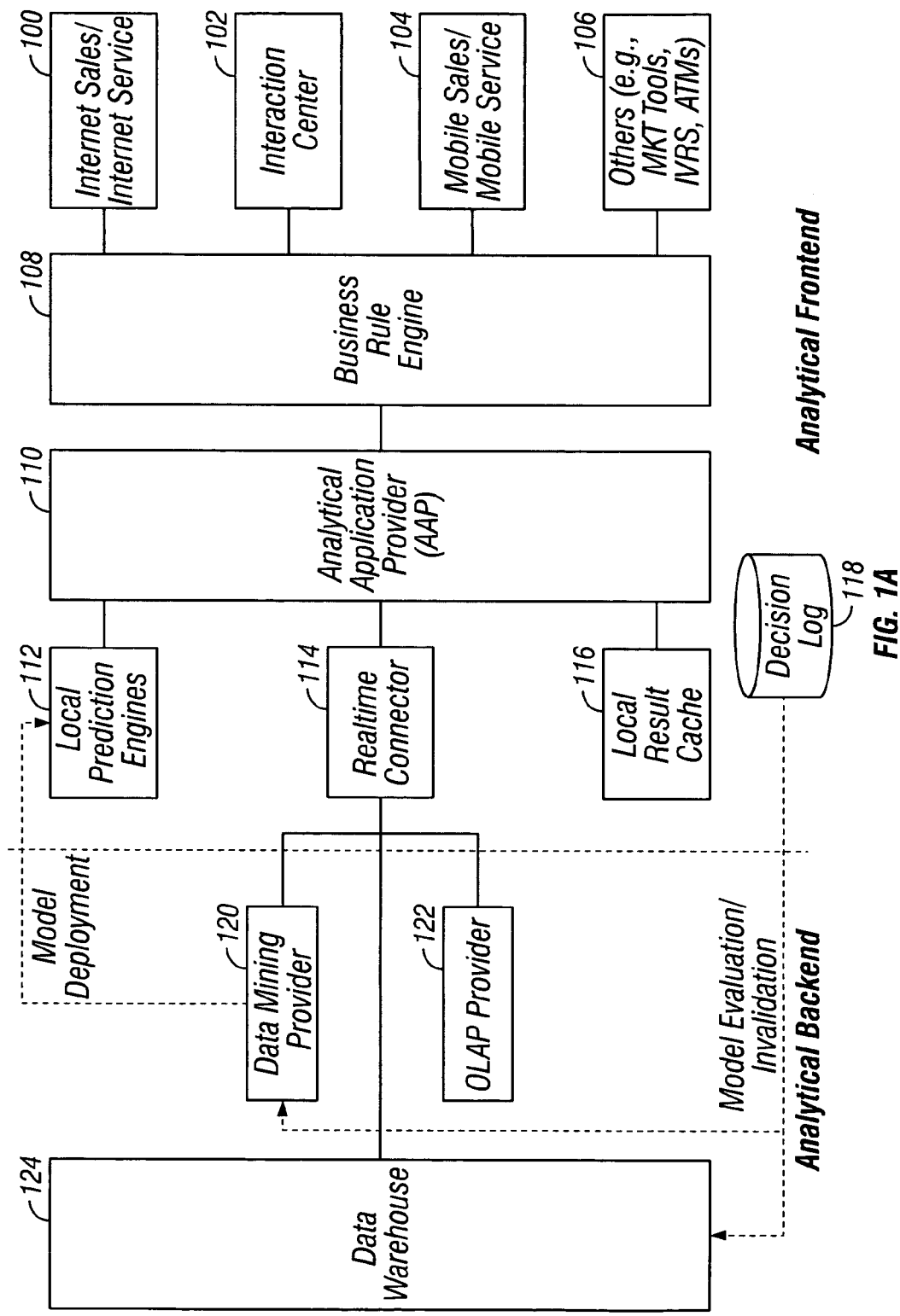

ANALYTICAL APPLICATION FRAMEWORK

TECHNICAL FIELD

This invention relates to computing systems that form an analytical application framework.

BACKGROUND

In a real-time analytics system, various front-end applications provide customer transaction data directly to an analytical software application that is capable of executing analytical tasks. An example of such an analytical software application is a prediction application that provides useful, predictive output relating to a transaction with a customer. An analytical software application is capable of processing real-time data from a customer to execute analytical tasks and to generate output in real time. In many instances, the analytical software application will use the real-time data in coordination with a data mining model to generate a predictive output. A data mining model typically contains rules and patterns derived from historical data that has been collected, synthesized, and formatted. In many instances, a predictive output generated upon execution of an analytical task is fed into a business rule engine. The business rule engine will use the predictive output in conjunction with its rule set to determine if certain events should be triggered in a given front-end application. For example, the business rule engine may determine that a special promotional offer should be provided to a particular customer given the content of the predictive output and the nature of the transaction with that customer. In some instances, the front-end applications may directly process the predictive output.

Certain front-end software applications often need to maintain direct interfaces to the analytical software applications to provide the real-time customer data for execution of analytical tasks. In maintaining these interfaces, the front-end software applications are required to have detailed knowledge of the specific types of analytical software applications and data mining models that are used. For example, a front-end application may need to provide specific input information that is specific to the type of analytical engine that hosts a given analytical software application. Front-end applications also directly exchange input and output data with these analytical software applications, and this data often has specialized formats that are associated with the specific analytical software applications that are utilized.

SUMMARY

Several implementations of the invention are described herein. One implementation provides a computer system that integrates software applications with analytical software applications. In this implementation, the computer system is programmed to receive a request from a software application to execute an analytical task, such as a prediction task or a key performance indicator (KPI) lookup task. The request includes a task name and input information. The computer system then uses the task name to identify an analytical engine and a data store, and invokes an analytical software application in the analytical engine to execute the analytical task. The analytical engine may be a prediction server or a KPI server, and the data store may be a data mining model or a KPI set. The analytical task is executed using the identified data store and the received input information. The computer system receives task output from the invoked analytical software application, the task output including output information generated during execution of the analytical task. The computer system then sends the output information to the software application that made the request.

The various implementations of the invention have many benefits and advantages. For example, front-end software applications are able to benefit from stable and generic application interfaces (API's) to implement real-time analytics. These API's do not need to manage variable or changing data types or formats typically arising from the exchange of data mining models and KPI sets, but rather can rely on stable connections to process various analytical tasks, such as KPI-lookup or prediction tasks. Because the front-end software applications can use generic API's, various different KPI sets, mining models, mining engines, and the like can be easily used in the system without interfering with the smooth flow of information to and from the applications. This greatly enhances the robustness and flexibility of these implementations and dramatically reduces the maintenance costs for application implementations.

Certain implementations of the invention provide additional benefits and advantages. For example, in some implementations, the front-end software applications maintain unified interfaces for all analytical tasks that are to be performed. In maintaining such interfaces, these applications are capable of using a predetermined format for sending and receiving application data to execute the analytical tasks. In one implementation, the applications send a set of all required input information for execution of the analytical tasks, and receive a set of output information generated from these tasks.

In some implementations, an analytical application provider (AAP) is capable of chaining together a number of analytical tasks transparently from front-end software applications. This is of benefit to these applications, because their complexity is minimized. The applications need only to request that high-level analytical tasks be executed, and the AAP will manage the invocation of all low-level analytical tasks that are to be performed as part of the high-level task. The AAP is capable of chaining together these low-level tasks in a serial fashion, but may also be capable of performing these low-level tasks in parallel as well.

The details of one or more implementations of the invention are set forth in the accompanying drawings and the description below. Other features, objects, and advantages of the invention will be apparent from the description and drawings, and from the claims.

DESCRIPTION OF DRAWINGS

FIG. 1A is a block diagram of a data processing system that provides real-time analytical functionality.

DETAILED DESCRIPTION

FIG. 1A is a block diagram of a data processing system that provides real-time analytical functionality. In this data processing system, Analytical Application Provider (AAP) 110 couples front-end software applications (such as applications 100, 102, 104, or 106) with analytical software applications on analytical engines, such as prediction servers or KPI (key performance indicator) servers, during the execution of analytical tasks. These analytical tasks include prediction tasks and KPI-lookup tasks. The front-end software applications 100, 102, 104, or 106 send requests for task execution to AAP 110, and AAP 110 then invokes execution of the analytical tasks in one of the analytical engines. The analytical engines may be local to AAP 110, or may instead be part of an analytical back-end. For example, the local prediction engines 112 are local to AAP 110, while the data mining provider 120 and OLAP (online analytical processing) provider 122 are part of the analytical back-end. After analytical tasks have been executed by the corresponding analytical engines, AAP 110 then routes output information generated from the execution of these tasks back to front-end applications 100, 102, 104, or 106.

Figure 1B:
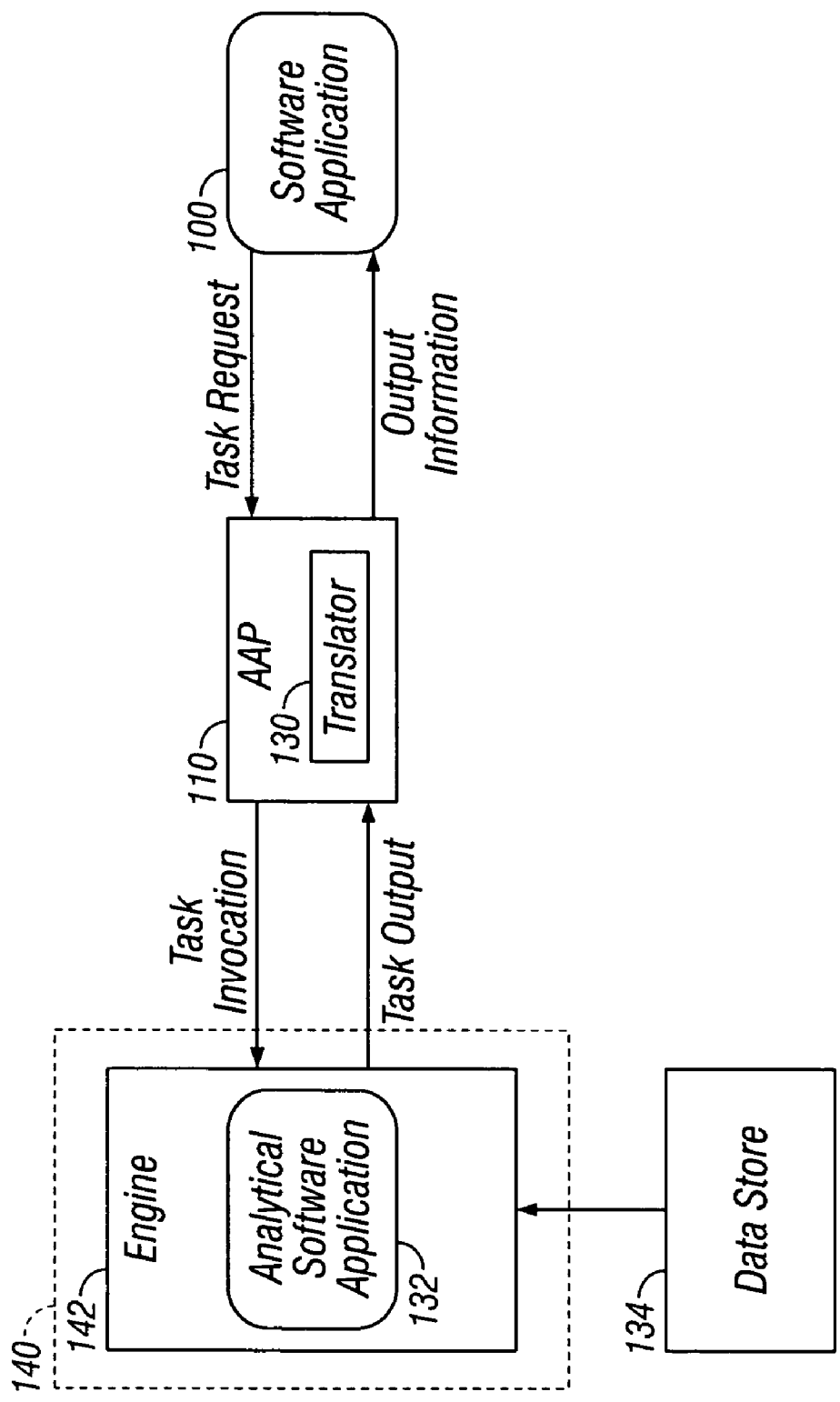
FIG. 1B is a block diagram showing the integration of software applications with analytical software applications using the Analytical Application Provider (AAP) shown in FIG. 1A.

A more detailed diagram of front-end software application 100 and AAP 110 is shown in FIG. 1B. The analytical engines 140 include individual engines, such as engine 142, that are used for executing analytical tasks. For example, the analytical software application 132 within engine 142 is capable of executing analytical tasks. The individual engines in the set of analytical engines 140 may include prediction servers and KPI servers for executing prediction and KPI-lookup tasks, respectively. In addition, these individual engines may be local to AAP 110 or may instead be part of an analytical back-end. These engines use various sets of information contained within data store 134 when executing analytical tasks. Data store 134 may contain data mining model information, as well as KPI-set information. In certain scenarios, the information contained within data store 134 is local to AAP 110. In these scenarios, the performance of task execution may be improved. However, in other scenarios, the information in data store 134 is part of an analytical back-end, which is remote from AAP 110. In these scenarios, the information may be stored in a data warehouse, such as data warehouse 124 (shown in FIG. 1A).

At run-time, software application 100 sends a request to AAP 110 to execute an analytical task, such as a prediction task. This request includes input information that is used for execution of the analytical task, and also includes a task name. AAP 110 uses the task name to identify an analytical engine and a data store (such as engine 142 and data store 134) that will be used for executing the task. AAP 110 then invokes analytical software application 132 on engine 142. Analytical software application 132 uses information contained within data store 134 and the input information from the request during execution of the task. By examining the request originally sent from software application 100, AAP 110 is capable of determining the analytical engine and data store information that are to be used in executing the task. AAP 110 also provides the necessary input information sent from software application 100 to analytical software application 132 for executing the task. As noted above, the analytical task may be a prediction task or a KPI-lookup task. The execution of an analytical task by AAP 110 may be faster if the analytical engine, such as engine 142, is local to AAP 110.

After executing the analytical task, analytical software application 132 then sends task output information back to AAP 110. This task output information includes information that was generated during the execution of the analytical task, such as predictive output information or KPI output information. Upon receipt of this information, AAP 110 then sends a response back to software application 100. This response includes the output information provided by analytical software application 132.

Figure 7A:
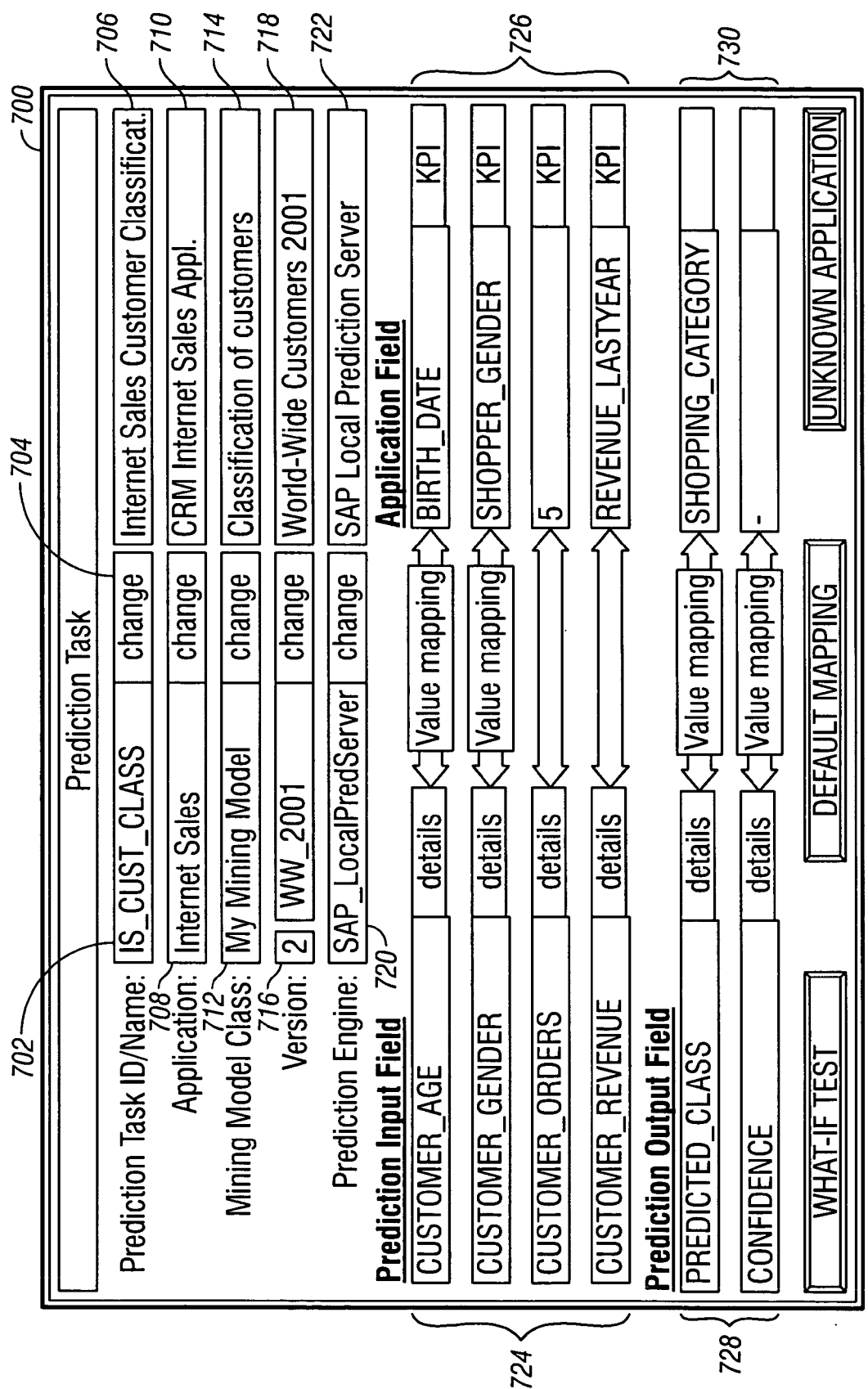
FIG. 7A is a screen display of a prediction task, according to one implementation of the invention.
Figure 9:
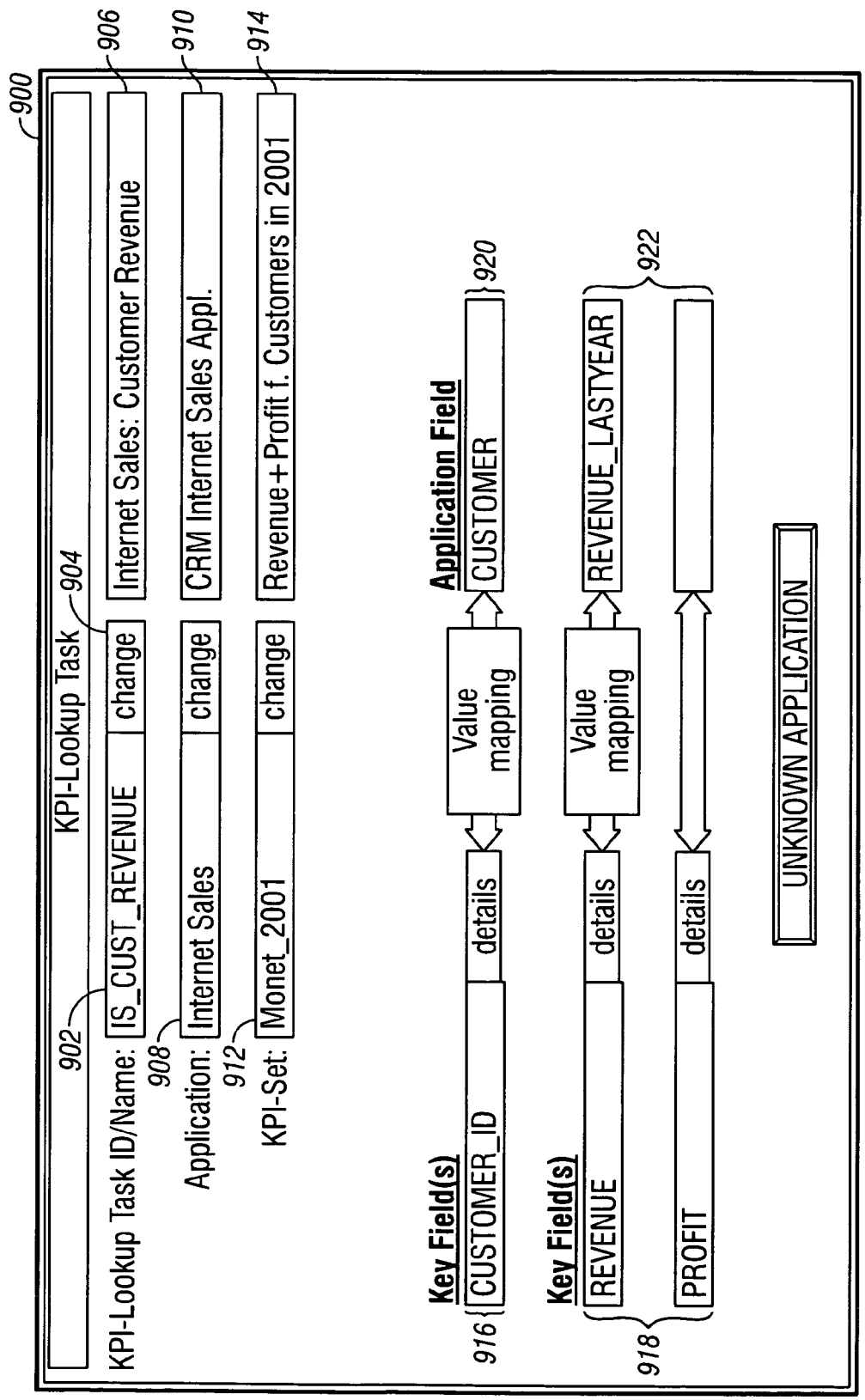
FIG. 9 is a screen display of a KPI-lookup task, according to one implementation of the invention.

A user or administrator may define the scope and content of the request that is sent from software application 100 to AAP 110 for executing the analytical task. This may occur at design-time, or may occur dynamically during run-time. The request includes a task name and other input information that is used during execution of the task. AAP 110 uses the task name to identify the type of task to be executed, such as a prediction task or KPI-lookup task. In one implementation, these tasks are defined on AAP 110. (FIG. 7A and FIG. 9 show example definitions of such tasks. These figures will be described in more detail below.) Because software application 100 needs only to provide the task name and input value information, the definition of tasks on AAP 110 provides all of the detailed analytical engine and data store information used for task execution. Different engines and data stores can be easily introduced into the system without changing the interface between AAP 110 and software application 100.

In some implementations, AAP 110 also contains mapping functionality. In the example shown in FIG. 1B, AAP 110 includes mapping function 130. When AAP 110 receives certain input information from software application 100 in the request, mapping function 130 translates one or more values of this input information into translated input values for use with the identified data store during execution of the analytical task. These translated input values have a format/type that is directly recognized and usable by the identified data store. Different data stores may use different data formats when used by analytical software application 132 to execute analytical tasks. Mapping function 130 is capable of translating the values of the input information sent from software application 100 into the appropriate translated values that are used by the particular data store. After analytical software application 132 executes a given task, it sends task output information to AAP 110. In some implementations, mapping function 130 translates one or more values of this output information into translated output information that is then sent back to software application 100. In this fashion, mapping function 130 is capable of formatting the output information into a type that is expected by software application 100.

AAP 110 shown in FIGS. 1A and 1B provides certain middleware functionality. Software application 100 need not be directly coupled to engine 142 and analytical software application 132, and this provides certain advantages. For example, software application 100 need not refer to the precise analytical engine and precise data store that are to be used, but would only refer to the task to be executed within AAP 110. The task definition in AAP 110 contains the information of the engine and data store to be used for task execution, which could be changed dynamically without impact on software application 100. This provides independence to software application 100, leading to reduced maintenance costs. The generic API to AAP 110 allows software application 100 simply to provide the task name and input data. In addition, software application 100 need not provide data store-specific information as input, because mapping function 130 in AAP 110 contains the data store-specific mapping functionality. This provides additional independence to the application, as the exchange of specific data values can be completely hidden from software application 100. In addition, various different engines and data stores can be more easily introduced into the system without adding extra interface overhead to software application 100. AAP 110 and mapping function 130 manage the engine- and data store-specific details.

As shown in FIG. 1B, requests and responses flow directly between software application 100 and AAP 110. In many implementations, a business rule engine, such as business rule engine 108 shown in FIG. 1A, couples software application 100 with AAP 110. In these implementations, business rule engine 108 passes requests sent from software application 100 directly to AAP 110. Business rule engine 108 also passes responses from AAP 110 to software application 100. In addition, business rule engine 108 also uses the output information in the responses sent from AAP 110 to determine if certain events should be triggered in software application 100. As part of the analytical front-end, business rule engine 108 provides functionality for the business rules that are to be applied. For example, business rule engine 108 may apply certain rules that initiate the offering of special discount offers to new or existing customers. Business rule engine 108 is coupled to software application 100, which is shown as an Internet sales/service application in FIG. 1A. Business rule engine 108 may also be coupled to various other front-end applications, such as Interaction Center application 102, mobile sales/service application 104, and other applications 106 (such as interactive voice response systems (IVRS), or automatic teller machines (ATM's)).

Referring again to FIG. 1A, data warehouse 124, data mining provider 120, and OLAP provider 122 serve as part of an analytical back-end that is coupled to AAP 110 via realtime connector 114. This analytical back-end may provide a framework and storage mechanisms for data mining models or other analytical data stores that are stored externally from AAP 110. These components of the analytical back-end are coupled to AAP 110 using real-time connector 114. Local versions of the data mining models or other data stores may be stored in local result cache 116 for faster and easier access by AAP 110. Certain analytical engines, such as engines 112, may also be local to AAP 110. Decision log 118 is used keep track of the predictions, KPI-lookups, and the rule executions during run time of the system. The information stored in decision log 118 may be viewed by an administrator to analyze various execution results. This information may also be used to judge the quality of prediction models and rules, and may also be fed back into data warehouse 124 for sophisticated long-term analyses. Based on these analyses, models may be re-trained, or updated, and rules may be re-adjusted and be automatically deployed to AAP 110 without impact to the front-end software applications.

In one scenario, a data mining expert may create and update mining models with data from a customer knowledge base in data warehouse 124. The data within data warehouse 124 could include customer profiles, historical customer orders, etc. OLAP provider 122 provides direct access to KPI information derived from customer profiles, historical customer orders, etc. Data mining provider 120 is used for model deployment, and data mining provider 120 also provides an interface to AAP 110 for executing remote predictions based on mining models located in data warehouse 124. Using real-time connector 114, a mining model can be exported to AAP 110. In one implementation, the model is in a PMML-compliant format. A PMML-compliant format is one that adheres to the syntax of the standardized Predictive Modeling Markup Language (PMML). PMML is used to define the components of a model in a standard form that can be interpreted by other computing systems.

In one implementation, real-time connector 114 can also connect to third-party mining providers, which themselves can export and import models and provide predictions based on their local models. These third-party mining providers can be located on local or remote servers.

It is not necessary that the system include data warehouse 124, data mining provider 120, OLAP provider 122, and real-time connector 114. For example, these components are not needed when the data stores used during the execution of analytical tasks are stored in local cache 116 and when local engines, such as local prediction engines 112, are utilized.

Figure 2:
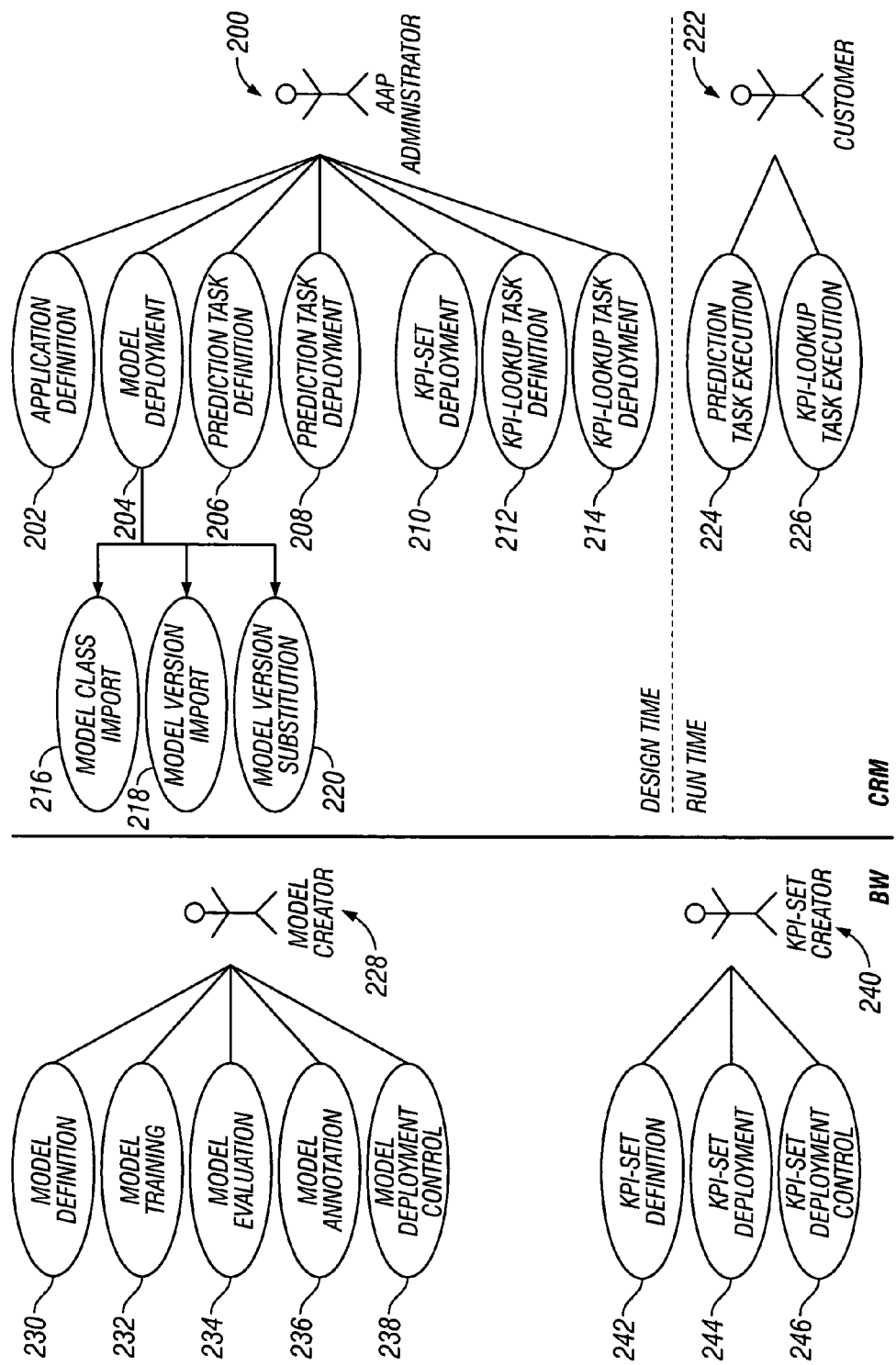
FIG. 2 is a use-case diagram of design- and run-time scenarios for various implementations of the invention.

FIG. 2 is a use-case diagram of design- and run-time scenarios for various implementations of the invention. FIG. 2 illustrates various use cases performed by the pictured actors in various design- and run-time scenarios. The use cases shown in FIG. 2 are performed to achieve various analytical functions in a computer system, such as the system shown in FIG. 1A.

FIG. 2 first shows various aspects of mining model creation. Model creator 228 is responsible for model definition 230, model training 232, model evaluation 234, model annotation 236, and model deployment control 238. These use cases typically occur within a data warehouse or a business information warehouse (BW). Model definition 230 includes the logical definition of a mining model that will be used within the system in terms of the information that will flow into the model. Model training 232 includes updating the model over time as it is used. Model evaluation 234 includes testing the quality and effectiveness of the model. Model annotation 236 includes annotating model semantics using textual descriptions to precisely describe the "rules" in the model. The annotations can be related to the entire model, as well as to individual elements of the model such as categories and clusters. Model annotations play an important part in allowing an AAP administrator to understand how a model can be applied for predictions in front-end applications. Model deployment control 238 includes deploying and exporting the model to AAP 110.

KPI-set creator 240 is responsible for KPI-set definition 242, KPI-set deployment 244, and KPI-set deployment control 246. KPI's, or key performance indicators, are key indicators or figures that can be derived from the data collected in a warehouse, such as data warehouse 124. KPI's may include such indicators as customer revenues and profits. KPI's may also contain aggregated customer information or other pre-calculated information. KPI's may be sorted by user or user category. KPI-set definition 242 includes logically defining the KPI's that are to be a part of the KPI-set, as well as defining the source of the KPI's. KPI-set deployment 244 and deployment control 246 include the deployment of the KPI-set to AAP 110.

The use cases shown in FIG. 2 include both design- and run-time use cases. At design-time, AAP administrator 200 is responsible for application definition 202, model deployment 204, prediction task definition 206, prediction task deployment 208, KPI-set deployment 210, KPI-lookup task definition 212, and KPI-lookup task deployment 214. Model deployment 204 includes model class import 216, model version import 218, and model version substitution 220.

Application definition 202 includes defining the scope of the particular CRM application. For example, AAP administrator 200 may define the applications shown in FIG. 1A, such as Internet sales/service 100, interaction center 102, or mobile sales/service 104. Model deployment 204 includes actually deploying of the model to be used within the system. In one implementation, deployment is restricted to specific roles. In this implementation, deployment controls may become part of the model definition. For example, the deployment of a specific model could be restricted to specific users/roles or also to specific applications. These deployment controls create a deployment authorization framework.

As part of model deployment 204, model class import 216 includes importing or manually defining the model class to be used. Model classes are containers for structurally equivalent models. The fields of model classes are a superset of all model fields of model versions belonging to the same class. Model versions are mining models within a model class. The model classes that can be used are ones that have been previously defined during model class deployment. In addition to importing the model class, AAP administrator 200 must also identify and import the model version, which constitutes model version import 218. The model version contains the most current model information. As time progresses, model information needs to be continually updated. As such, newer and more recent model versions may need to be imported into the system to substitute the older versions. Therefore, model deployment 204 also includes model version substitution. The model class and model versioning concepts allow an administrator to easily switch between different model versions by changing the version number, without needing to make completely new specifications for the new model versions. For example, mappings for the old model version can be inherited and re-used for the new model version, as model versions use the same data formats and model fields.

Prediction task definition 206 includes defining a prediction task that is to be deployed by the system. Prediction tasks are used by the application at run-time to obtain prediction information from analytical models. Prediction tasks may include prediction engine and mining model definitional information, so that the AAP may properly select these components for task execution at run time. These tasks may further include input field value information needed for execution of the tasks. Prediction task deployment 208 includes actual deployment of the prediction task within the application that had previously been defined during prediction task definition 206. Upon such deployment, the application has the capability to implement the prediction tasks later (i.e., at run time).

KPI set deployment 210 includes deployment of the KPI set within an application that had been previously defined during KPI set definition 242. Upon deployment, the KPI set is available for later use by the application at run time. KPI-lookup task definition 212 includes defining a KPI-lookup task that is to be deployed by the system. KPI-lookup tasks are used by the application at run-time to obtain KPI information. KPI sets are originally created by KPI set creator 240, as described earlier. KPI-lookup tasks may include KPI-set definitional information, so that the AAP may properly select the appropriate KPI-set used at run time during task execution. These tasks may further include input field value information needed for execution of the tasks. Lastly, KPI-lookup task deployment 214 includes actual deployment of the KPI-lookup task within the application. Upon such deployment, the application has the capability to implement the KPI-lookup tasks later (i.e., at run time).

At run-time, prediction task execution 224 and KPI-lookup task execution 226 occur while a front-end application, such as application 100, 102, 104, or 106 shown in FIG. 1A, processes a transaction with customer 222. In one implementation, customer 222 is involved in a session using Interaction Center application 102. An Interaction Center is an on-line interactive session between a customer and a call-center agent. The call-center agent has the ability to answer the customer's questions, and to provide feedback directly to the customer during the on-line session. Both the customer and call-center agent may use a web-based interface to communicate with one another. In another implementation, customer 222 is involved in a session using Internet sales/service application 100.

Prediction task execution 224 and KPI-lookup task execution 226 are initiated by requests sent from front-end applications 100, 102, 104, or 106. These front-end applications send requests to initiate the analytical tasks 224 or 226 as a direct result of real-time interaction with customer 222. Front-end applications 100, 102, 104, or 106 determine when requests for analytical tasks 224 or 226 are to be invoked as a result of the context and state of the transaction with customer 222.

KPI-lookup task execution 226 includes executing a run-time KPI-lookup task. This KPI-lookup task is one that had been previously defined and deployed at design-time. As noted earlier, KPI-lookup tasks utilize the KPI-sets to lookup KPI information that is sent back to the front-end applications.

Prediction task execution 224 includes executing a run-time prediction task. This prediction task is one that had been previously defined and deployed at design-time. As noted earlier, prediction tasks utilize mining models, such as predictive models. Prediction tasks use real-time information provided by the application to generate prediction results as output (e.g., customer attractiveness). In one implementation, prediction tasks also use KPI information (e.g., customer revenue) in generating predictions. An application may use the predictive output, along with business rules, to determine if customer 222 will be provided with special offers, promotions, and the like.

Figure 3:
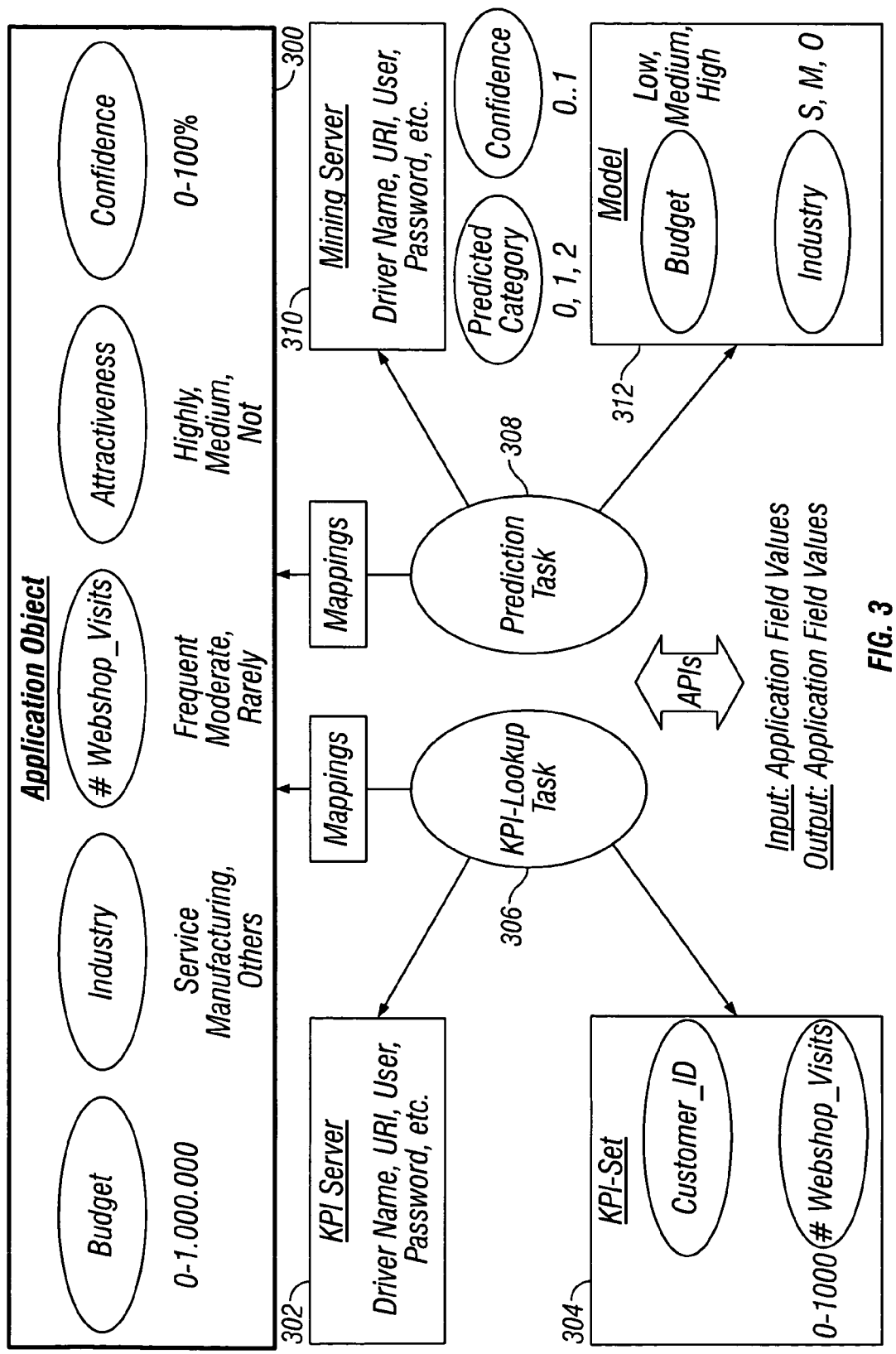
FIG. 3 is a conceptual diagram of an exemplary object model for the AAP.

FIG. 3 is a conceptual diagram of an exemplary object model for the AAP. The objects shown in FIG. 3 are included within an exemplary object model designed for the AAP. The design shows an implementation of how such tasks could be executed in a system such as the one shown in FIG. 1A. FIG. 3 shows how an application interacts with an AAP, such as AAP 110 shown in FIG. 1A, to implement KPI-lookup and prediction tasks. In particular, FIG. 3 shows various mappings between elements within an application object to elements used for KPI-lookup and prediction tasks.

FIG. 3 shows application object 300, KPI server 302, KPI set 304, mining server 310, model 312, KPI-lookup tasks 306, and prediction task 308. Application object 300 maintains information that can be provided by an application as input for the execution of tasks at run time. KPI server 302 manages KPI operations and interactions. Therefore, KPI server 302 keeps driver names for the drivers to connect to the KPI providers (engines), and user identifications, passwords, etc. as login credentials for the KPI providers. KPI server 302 manages these operations at run time to facilitate the functionality required for KPI-lookup tasks. KPI set 304 includes stored KPI information that can be retrieved during a KPI-lookup task. Mining server 310 manages prediction operations and model import/export. Therefore, mining server 310 keeps driver names for the drivers to connect to the mining providers (engines), and user identifications, passwords, etc. as login credentials for the mining providers. Mining server 310 manages these operations at run time to facilitate the functionality required for prediction tasks. Model 312 includes stored information for the predictive model used during a prediction task. In one implementation, model 312 and KPI set 304 represent data stores that are stored locally within the AAP, such as AAP 110 shown in FIG. 1A. Mining server 310 and KPI server 302 provide connections to mining providers and KPI providers. These providers can be local to the AAP (e.g., in the case of a local prediction engine), or can be connections to remote providers.

As shown in FIG. 3, application object 300 contains various attributes, or fields. For example, application object 300 may contain a budget field, an industry field, a "# of webshop visits" field, an attractiveness field, and a confidence field. These fields include both input and output. Input fields are those maintained by application object 300 and used as input for either KPI-lookup or prediction tasks. Output fields are those obtained as output from the KPI-lookup or prediction tasks. The budget and industry fields are input fields. The "# of webshop visits", attractiveness, and confidence fields are output fields. The budget field indicates a given budget that applies to a given industry. The industry field indicates the type of industry (such as service, manufacturing, or other). These two input fields are used by model 312 (during prediction task 308) to help generate predictive output. This predictive output generates the output fields attractiveness (high, medium, or none) and confidence level (0-100%). The attractiveness field indicates whether an individual is an attractive candidate, and the confidence field indicates the confidence rating of the prediction. These output fields can be used in coordination with business rules to determine if a given customer will be given a special offer or promotion. For example, if the customer is predicted as a highly attractive one with a 75% (or higher) confidence rating, the business rules would indicate that a special promotion should be offered. The "# of webshop visits" field is also an output field. The value of this output field is provided by KPI set 304 to indicate if an individual has visited a webshop frequently, moderately, or rarely. In one implementation, the "# of webshop visits" field may also be used as input for prediction task 308.

An operational CRM system implements KPI-lookup tasks and prediction tasks (such as tasks 306 and 308), as shown in the example in FIG. 3. KPI-lookup task 306 uses KPI server 302 and KPI set 304 and provides for the run-time functionality of looking up KPI information. This KPI information is then sent back to application object 300. This KPI information may be used directly by application object 300, or may additionally be used as input to a prediction task, such as prediction task 308.

KPI-lookup task 306 will be initiated by the application in FIG. 3, and will use input information as specified in application object 300. Although not shown, application object 300 may provide a customer ID that will be used by KPI-lookup task 306. In one implementation, the customer ID is an input field in application object 300. KPI-lookup task 306 uses KPI server 302 to help manage the functionality required for run-time execution of the task. In addition, KPI-lookup task 306 will use the input information from application object 300 to obtain the requested KPI information from KPI set 304. In one implementation, KPI-lookup task 306 contains mapping information for use by the AAP to translate field information in application object 300 to field information used by KPI set 304. In addition, KPI-lookup task 306 also contains mapping information for use by the AAP to translate field information from KPI set 304 back to application object 300. This mapping functionality may be required to directly map field elements, or to also possibly convert between differing field data types. For example, KPI set 304 maintains a "# of webshop visits" field having values from 0-1000. Application object 300, however, maintains a separate "# of webshop visits" field having the values of "frequent," "moderate," and "rare." Thus, these separate fields in KPI set 304 and application object 300 do not have the same data type. KPI-lookup task 306 contains mapping functionality to translate the values from one "# of webshop visits" to the other. For example, the mapping functionality may designate that "# of webshop visits" in KPI set 304 having values between 0-50 map to the value of "rare" within application object 300. Similarly, values between 51-600 may map to the value of "moderate," and values between 601-1000 may map to the value of "frequent." These and other forms of mapping functionality may be utilized by KPI-lookup task 306.

In some implementations, prediction task 308 or KPI-lookup task 306 may require input that is not available to, or provided by, application object 300. In these implementations, the mapping functionality provides the missing information. This information could include certain default values or constants. In some implementations, the mapping functionality dynamically determines the input that is provided to the task based on the context of the information in application object 300.

Prediction task 308 uses mining server 310 and model 312 to help manage the functionality required for run-time execution of the task. Prediction output information is provided to application object 300, which may later be processed by one or more business rules. At run time, an application initiates prediction task 308 and provides input information, such as budget and industry information. Prediction task 308 processes this input information in model 312 in using mining server 310. Model 312 is a predictive model that is capable of generated predictive output when processed by mining server 310. Model 312 uses the input information for budget and industry and generates predictive output for an attractiveness category and for confidence. The predictive output is then sent back to application object 300. Prediction task 308 also contains mapping information for use by the AAP to map field values between application object 300 and model 312. For example, both application object 300 and model 312 contain budget and industry fields. These are input fields. In general, input fields may be used to hold a wide variety of information, including customer or attribute information. However, the field data types often need to mapped to one another. In some cases, direct mapping is possible between field values. For example, the industry field values in application object 300 (service, manufacturing, and others) can be directly mapped to the industry field values in model 312 (S, M, O) because these field values have substantially the same data types. In other cases, indirect mapping, or conversion, is required. For example, the budget field values in application object 300 (0-1,000,000) cannot be directly mapped to the budget field values in model 312 (low, medium, high). Therefore, the AAP needs to be capable of translating between these field values using an indirect, or conversion, function. For example, values from 0-100,000 may be mapped to "low." Similarly, values from 100,001-700,000 may be mapped to "medium," and values from 700,001-1,000,000 may be mapped to "high."

Additionally, both application object 300 and model 312 contain predicted attractiveness category and confidence fields. These are output fields. These fields also must be mapped to one another. Prediction task 308 uses model 312 and mining server 310 to generate an attractiveness category of 0, 1, or 2. These must be mapped to the attractiveness field values for application object 300 of high, medium, and none. In one example, an attractiveness category of 0 could be mapped to a value of none, while a category of 2 could be mapped to a value of high. Prediction task 308 also uses model 312 and server 310 to generate a confidence of 0.1. These must be mapped to the percentages (0-100%) of the confidence field in application object 300. These and other forms of mapping functionality may be utilized by the AAP for prediction task 308.

FIG. 4 through FIG. 9 show displays of various screens that are used in designing or creating various components used in a real-time analytics system, such as the system shown in FIG. 1A. A user or administrator may use the menus and options shown on these screen displays for performing some of the use cases shown in FIG. 2, such as application definition, model definition, KPI-set definition, prediction task definition, KPI-lookup task definition, and the like. These screen displays are shown for exemplary purposes only.

Figure 4:
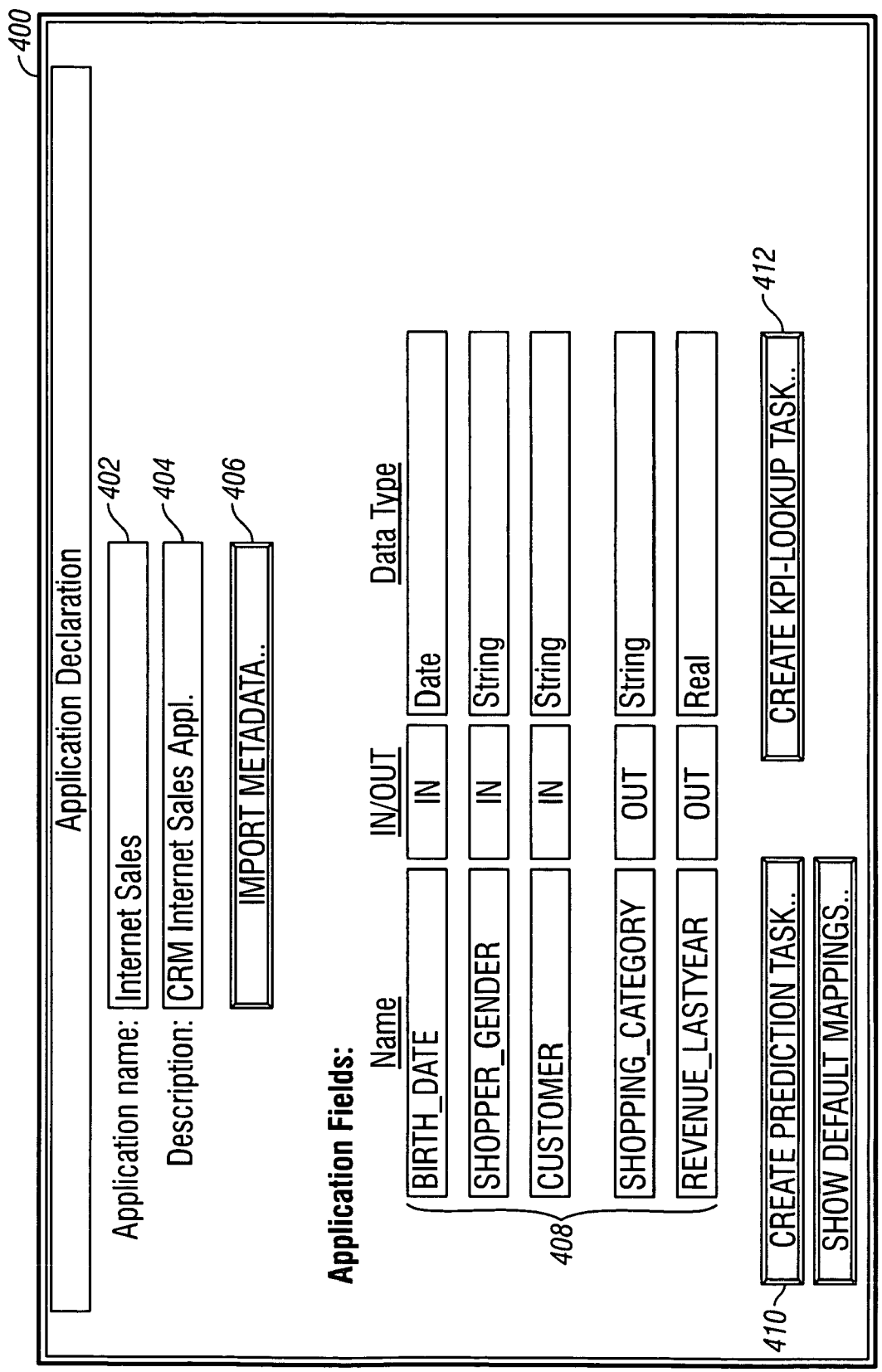
FIG. 4 is a screen display of an application declaration, according to one implementation of the invention.

FIG. 4 is a screen display of a front-end application declaration, according to one implementation of the invention. In this implementation, screen display 400 shows an application declaration that is used during the application definition process, such as application definition 202 shown in FIG. 2. During this process, an administrator is able to set up a front-end application that is capable of using real-time analytics functionality by invoking prediction or KPI-lookup tasks.

Screen display 400 shows a page for application declaration. This page includes name field 402, description field 404, import button 406, application fields 408, prediction task button 410, and KPI-lookup task button 412. In the example shown, name field 402 shows that the application name is "Internet Sales." Description field 404 indicates that the application is a CRM Internet sales application, such as Internet sales/service application 100 shown in FIG. 1A. Import button 406 allows a user to import metadata into the application declaration automatically, thereby relieving the user of having to manually enter the information. In one implementation, this is achieved by selection of a specification, such as a business object specification, that has been previously registered into the AAP. When a user, such as an administrator, imports this specification, all attributes are automatically imported into the declaration application.

Application fields 408 specify the specific processing fields used by the application at run time. Each application field has a name, an in/out designation, and a data type. The name is a unique name within the set of application fields 408. The in/out designation specifies whether an application field is used as input to a prediction or KPI-lookup task, or whether the field is used for output generated by the prediction or KPI-lookup task and sent back to the application. The data type indicates the type of data stored in the application field as a value. The data types shown in FIG. 4 are date, string, and real (i.e., floating point).

Prediction task button 410 and KPI-lookup button 412 are used by the administrator to create real-time tasks that are to be associated with the application. The administrator may select button 410 to create a prediction task and button 412 to create a KPI-lookup task. At run-time, after an application has been defined in the AAP, mining models can be used to allow the application to perform prediction, and KPI sets can be used to allow the application to perform KPI lookups as well.

Figure 5A:
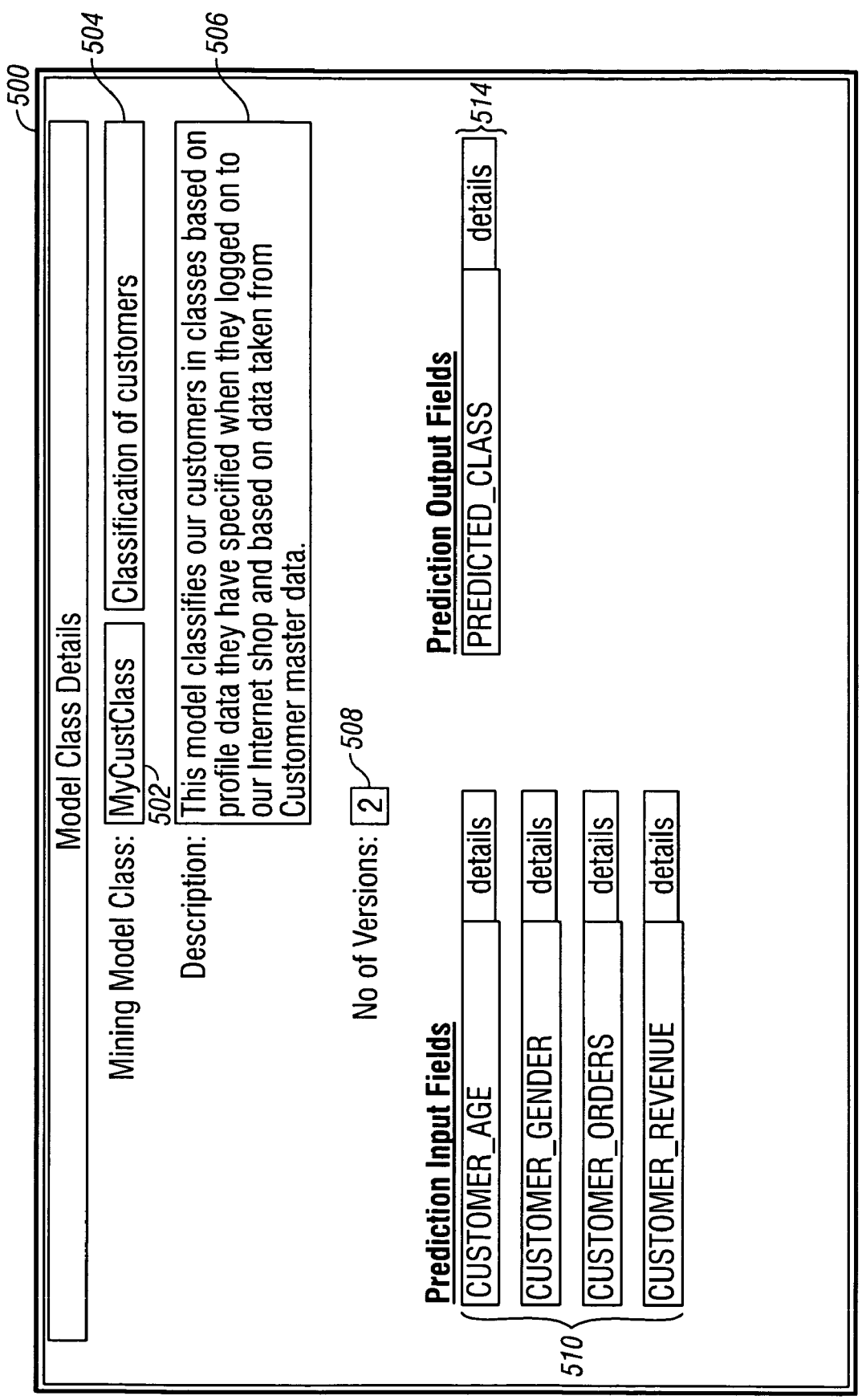
FIG. 5A is a screen display of a mining model class, according to one implementation of the invention.

FIG. 5A is a screen display of a mining model class, according to one implementation of the invention. In this implementation, screen display 500 shows the details of a mining model class that has been either manually specified by an AAP administrator or that has been automatically created by the AAP when a model version has been deployed for the model class. An AAP administrator may manually specify the model class if the set of fields is known. Alternatively, the AAP is able to automatically define the model class when it imports a version of the model class. The fields can be derived from the model version and used for the specification of the model class.

Screen display 500 shows a page for the details of a model class. Screen display 500 includes class name field 502, classification field 504, description field 506, version field 508, prediction input fields 510, and prediction output fields 514. As shown in the example in FIG. 5A, class name field 502 indicates that the name of the mining model class is "MyCustClas." Classification field 504 indicates that the model class is used for the classification of customers. Description field 506 provides the high-level description of the model class. This description is entered by the model creator. Version field 508 indicates the number of different versions that exist for the model class. A model class can have one or more versions. Later versions of the class may contain more specific or up-to-date information. The model class shown in FIG. 5A has two different versions.

Prediction input fields 510 and prediction output fields 514 indicate the input and output fields that are used for prediction by the mining model. The mining model obtains values for the input fields from the application to generate predictive output. This predictive output is captured in the prediction output fields and sent back to the application. As shown in FIG. 5A, the prediction input fields 510 include CUSTOMER_AGE, CUSTOMER_GENDER, CUSTOMER_ORDERS, and CUSTOMER_REVENUE. The values for these fields originate in the application and are provided to the model class through the execution of prediction tasks, in one implementation. The prediction output fields 514 include the PREDICTED_CLASS field. The value of this field is sent back to the application after the prediction has been generated.

Details buttons are used for providing detailed information about the fields. The model creator may select one of these buttons to view or enter detailed information about prediction input fields 510 or about prediction output fields 514.

Figure 5B:
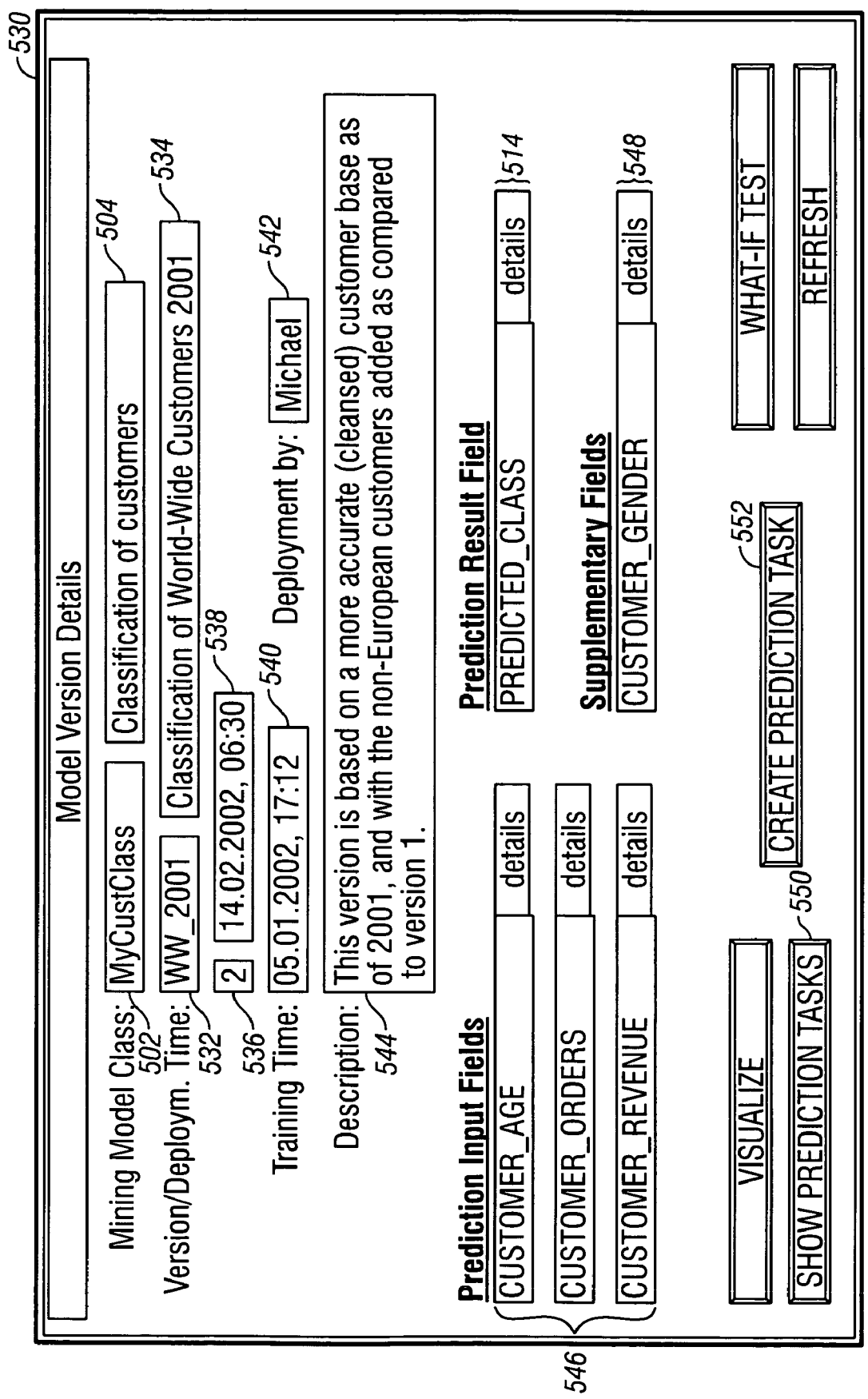
FIG. 5B is a screen display of model version details for the mining model class shown in FIG. 5A.

FIG. 5B is a screen display of model version details for the mining model class shown in FIG. 5A. The model shown in the example of FIG. 5B is a version of the model that was earlier described in FIG. 5A. An administrator is capable of defining one or more versions of a mining model. In one implementation, all model versions have a compliant set of logical attributes. That is, the fields of a model version are a subset of the model class fields, and the data type of the model version field is the same or a more specific one than that of the model class. For example, if the data type of the model class field CUSTOMER_AGE is an integer, then the data type of a model version field of CUSTOMER_AGE may be a real number.

In screen display 530 shown on FIG. 5B, field 532 indicates the name of the specific model version, and field 534 provides a brief description of the version. Version field 536 indicates the version number, and deployment time field 538 provides the date and time to indicate when the model version was deployed. By looking at these fields, an administrator is able to determine how current a given model version is. Training time field 540 indicates when the model version was trained, and field 542 provides information to indicate who deployed the model version. Description field 544 provides a more detailed description of the model version. In the example shown in FIG. 5B, description field 544 indicates that the model version is based on a more accurate customer base as of 2001 and includes non-European customers.

In FIG. 5B, prediction input fields 546 are a subset of those shown from fields 510 in FIG. 5A. Notice that prediction input fields 546 include only CUSTOMER_AGE, CUSTOMER_ORDERS, and CUSTOMER_REVENUE. They do not include CUSTOMER_GENDER, which is included in the set of fields 510 of FIG. 5A. Instead, the CUSTOMER_GENDER field is included in the set of supplementary fields 548. In one implementation, supplementary fields 548 are not necessary, as input, to the prediction process. In this implementation, supplementary fields 548 are still included in the definition, and mapping functionality for these fields is still provided. The reason for this is that supplementary fields 548 may become required fields for the prediction task in the next version of the model used for the predictions, and this facilitates the dynamic substitution of one model version to the next. This structure demonstrates that a model version may have a slightly different organization than its model class. FIG. 5B shows that the model version contains the same set of prediction output (i.e., result) fields 514 as the model class.

Button 550 is used for showing all prediction tasks that are associated with the given model version. In addition, button 552 may be selected for creating a new prediction task to be associated with the model version. These prediction tasks are also associated with the host application, according to one implementation.

Figure 6:
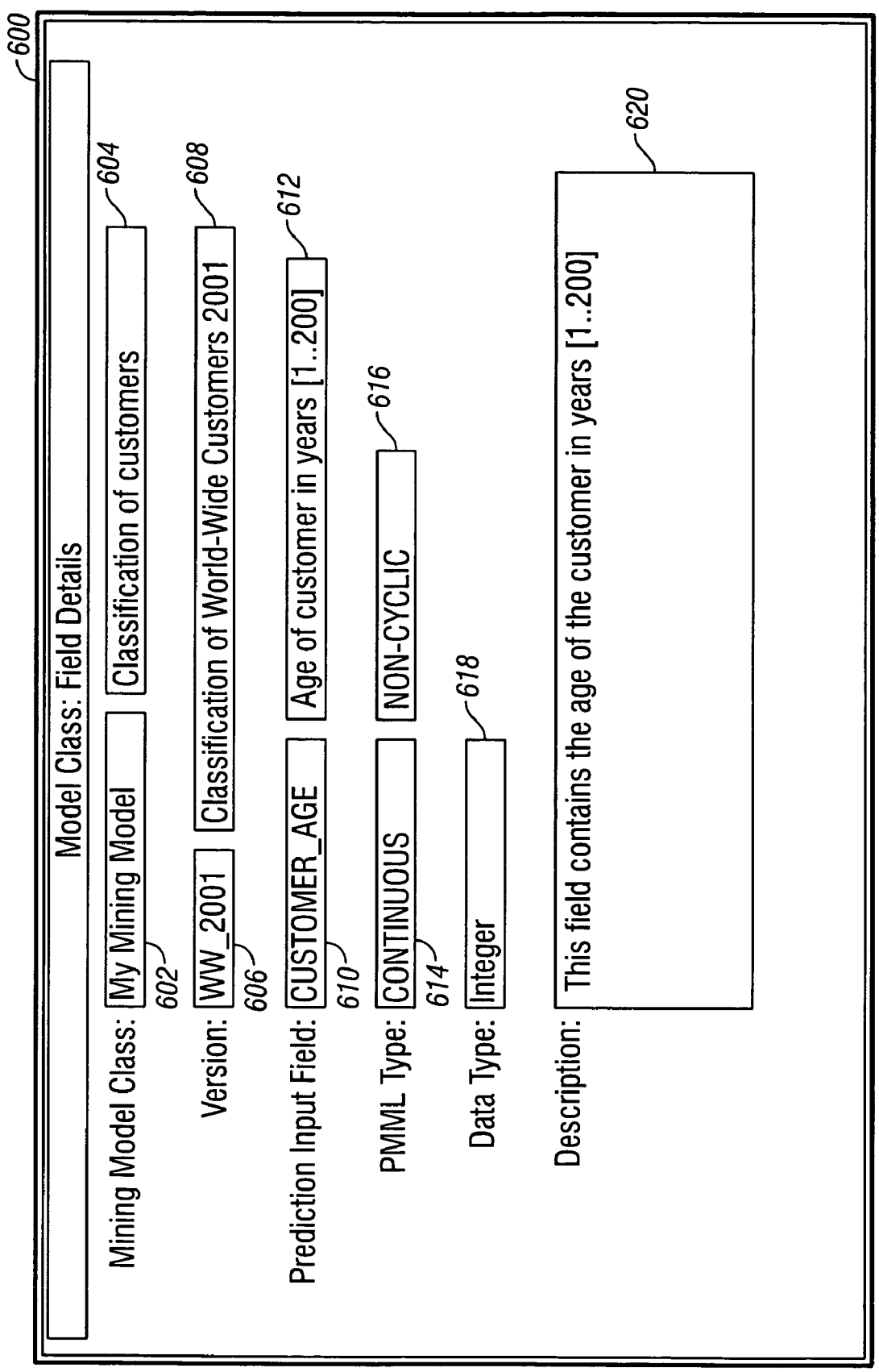
FIG. 6 is a screen display of field details for a model class, according to one implementation of the invention.

FIG. 6 is a screen display of field details for a model class, according to one implementation of the invention. FIG. 6 shows the details for the prediction input field of CUSTOMER_AGE that was shown in FIG. 5A. In one implementation, a model creator selects one of the details buttons to bring up the page shown in screen display 600 to view or entered detailed information about this input field.

Screen display 600 shows a page having various fields. These include class reference field 602, classification field 604, version field 606, version description field 608, prediction reference field 610, data description field 612, model type fields 614 and 616, data type field 618, and general description field 620. Class reference field 602 shows the mining model class with which the prediction field is associated. In the example shown, the associated class is "My Mining Model." Classification field 604 refers to the classification used for the class.

Version field 606 shows the class version being utilized. As described earlier, a mining model class may have one or more versions. The version shown in FIG. 6 is "WW_2001," which is used for the classification of World Wide customers in 2001, as indicated by version description field 608. Prediction reference field 610 indicates the name of the prediction field for which details are provided. As shown, the field is the CUSTOMER_AGE prediction input field, and data description field 612 indicates that this field designates the age of customers in the year range [1 . . . 200]. Model type fields 614 and 616 specify the model type for the model class. In the example shown in FIG. 6, the model is one defined using the Predictive Modeling Markup Language (PMML), and the PMML types are continuous and non-cyclic. Data type field 618 indicates that the CUSTOMER_AGE field contains integer values. Lastly, general description field 620 provides a brief general description of the CUSTOMER_AGE field.

FIG. 7A is a screen display of a prediction task, according to one implementation of the invention. In this implementation, screen display 700 shows how an administrator, such as AAP administrator in FIG. 2, is able to define a prediction task. A prediction task is an analytical task, in one implementation. A prediction task is initiated by an application, such as an Internet sales application, to obtain predictive output. The prediction task has a format that includes a set of input and output fields. The application initiates the task by sending a request to the AAP using a real-time task interface. The predictive output is then used by the application to initiate subsequent events, such as offering a special promotion to a valued customer. A system, such as AAP 110 shown in FIG. 1A, processes the information contained in the prediction task to help determine the logistics for executing the task. For example, AAP 110 is able to use the information provided in the prediction task to identify the mining model class and prediction engine that are to be used in executing the task. AAP 110 is also able to identify the application and prediction fields that are used for task execution, and the pertinent value mappings between such fields.

In FIG. 7A, screen display 700 shows a page for defining a prediction task. The page contains various fields. An administrator can use these fields to enter, review, and revise the definition of the prediction task. Name field 702 indicates the name (or identifier) of the prediction task. The administrator may select button 704 to change the contents of name field 702. Name description field 706 provides a brief description of the name of the prediction task. Application field 708 indicates the type of application that will be utilizing the prediction task. As shown in the example in FIG. 7A, the application is an Internet sales application. Application description field 710 provides a brief description of the application.

Model class field 712 indicates the name of the mining model class that will be used to implement the predictions. Model class description field 714 provides a brief description of the model class that is used. Version field 716 indicates the version number of the mining model specified in model class field 712. There may be one or more versions of the model, and version field 716 specifies which version will be used by the prediction task. As shown in FIG. 7A, version field 716 indicates that version "2" corresponding to "WW_2001" is to be used. Version description field 718 provides a brief description of the version. Prediction engine field 720 indicates the prediction engine that will be used for generating the predictive output. The prediction task uses the mining model in the prediction engine to generate this output. The prediction engine may be either a local or remote engine. Engine description field 722 provides a brief description of the prediction engine that is used.

Prediction input fields 724 are those set of fields used as input to the prediction process. Typically, the values for these fields are provided by the application, such as an Internet sales application. These input fields provide the mining model with the information that is used to generate predictions. As shown, the input fields are CUSTOMER_AGE, CUSTOMER_GENDER, CUSTOMER_ORDERS, and CUSTOMER_REVENUE. Although the values for these fields are provided by the application, there is not always a direct mapping of the fields that are maintained by the application and those maintained by the mining model. For example, application fields 726 do not have the same field names (or value types, in some cases) as prediction input fields 724. Therefore, in some instances, a mapping function is utilized. This mapping function is included within the scope of the prediction task. To give an example, the value of the application field of BIRTH_DATE is mapped to an age as specified by the CUSTOMER_AGE prediction input field. The prediction task uses the birth date to determine a current age. This type of mapping utilizes a conversion function. The mapping function does not require any conversion in some instances. For example, the application field of SHOPPER_GENDER can be directly mapped to the CUSTOMER_GENDER prediction input field. All of application fields 726 are mapped in some fashion to prediction input fields 724 within the prediction task.

Prediction output fields 728 contain values that are generated as a result of prediction processes. As shown in the example in FIG. 7A, these fields include the PREDICTED_CLASS and CONFIDENCE fields. The value for these fields are sent back to the application as predictive output. However, the application has a separate set of output fields 730 to capture this predictive output. Therefore, the prediction task also has a mapping functionality to map prediction output fields 728 to output fields 730 for the application. Note that the prediction output field of CONFIDENCE has no corresponding output field used by the Internet sales application in the example shown in FIG. 7A.

Application fields 726 include KPI buttons in one implementation of the invention. In this implementation, a prediction task can be combined with a KPI-lookup task. This is done when a KPI is used as an input to the prediction process. Thus, KPI buttons are provided for each application field that is used for prediction input. If an administrator selects this button, a KPI-lookup task is selected for delivering a KPI, and the delivered KPI will be assigned to the model field. This type of assignment creates an automatic invocation of the KPI-lookup task as a prerequisite to the prediction task. As shown in FIG. 7A, the REVENUE_LAST YEAR field will be the result of a KPI-lookup task if the administrator has selected the KPI button located to the right of this field. In this case, the results of the KPI-lookup task will be mapped to the CUSTOMER_REVENUE prediction input field. Any input values required for a given KPI-lookup task are also listed as part of the prediction task as well, according to one implementation. In this implementation, all input values for the KPI-lookup and prediction tasks are grouped together and provided in a unified set of input values.

In one implementation, an application can easily switch between model versions simply by changing the version number, without specifying a new mapping between the application and the model version. If a prediction task gets switched to another version, it inherits the mappings between application fields 726 and prediction input fields 724, and also inherits the mappings between prediction output fields 728 and fields 730. These mappings can be overridden, or changed, to consider the specifics of the model version. For example, if the new model version has fewer fields than the previous model version, then the mappings can be changed accordingly.

Figure 7B:
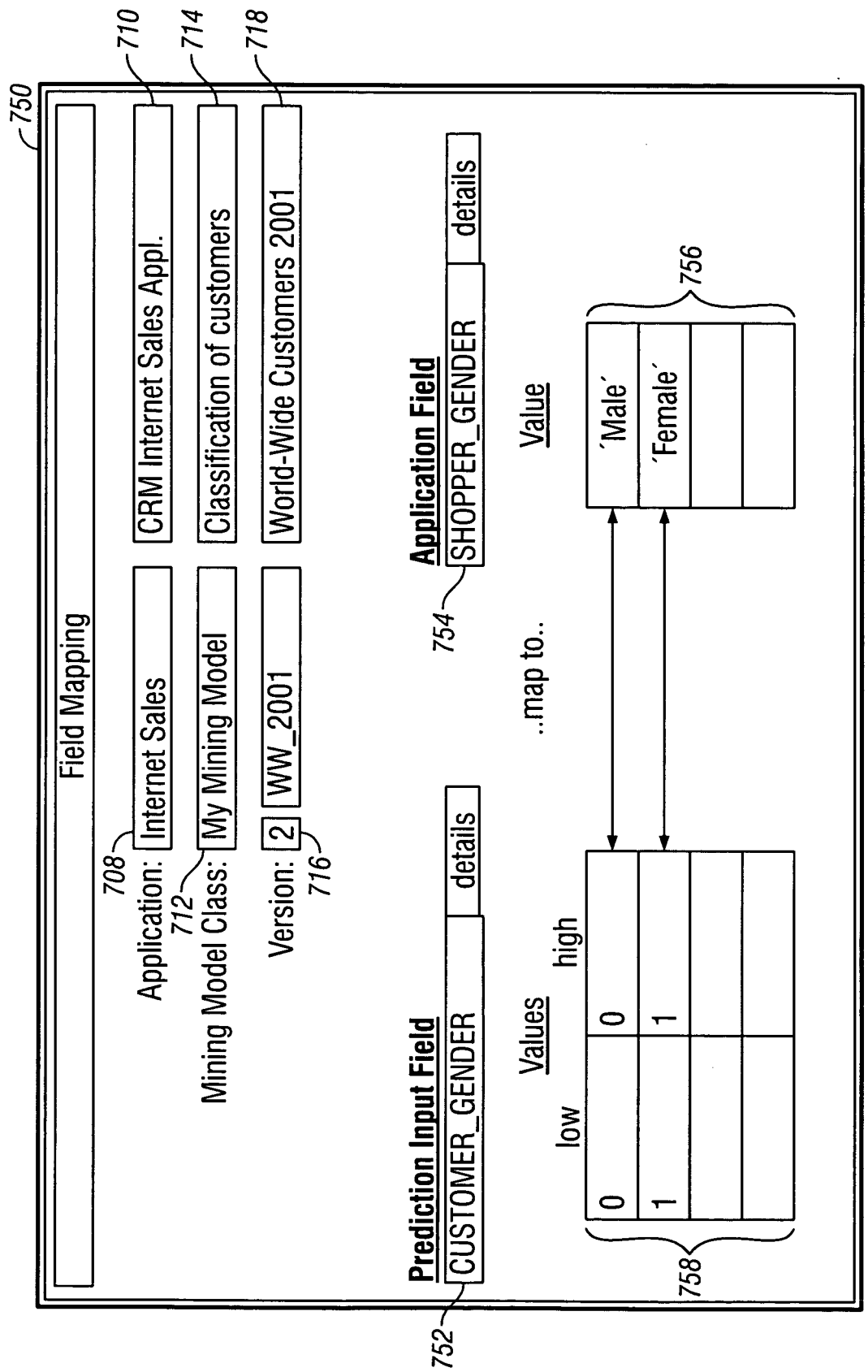
FIG. 7B is a screen display of a field mapping definition according to one implementation of the invention.

FIG. 7B is a screen display of a field mapping definition according to one implementation of the invention. FIG. 7B shows how one of the prediction input fields from set 724 (shown in FIG. 7A) is mapped to one of the application fields from set 726. Screen display 750 shows fields 708, 710, 712, 714, 716, and 718 from FIG. 7A. In addition, FIG. 7B shows a specific prediction input field 752, CUSTOMER_GENDER, and a specific application field 754, SHOPPER_GENDER. As described earlier, input fields such as these may often utilize a mapping function. In the example shown in FIG. 7B, values 756 are mapped to values 758. In this example, 'Male' from values 756 is mapped to '0' in values 758. 'Female' from values 756 is mapped to '1' in values 758. This is just one example of a mapping functionality that may be utilized by the prediction task. For example, other integer, real, enumerated, etc., types may be used for the mapping function.

Figure 8:
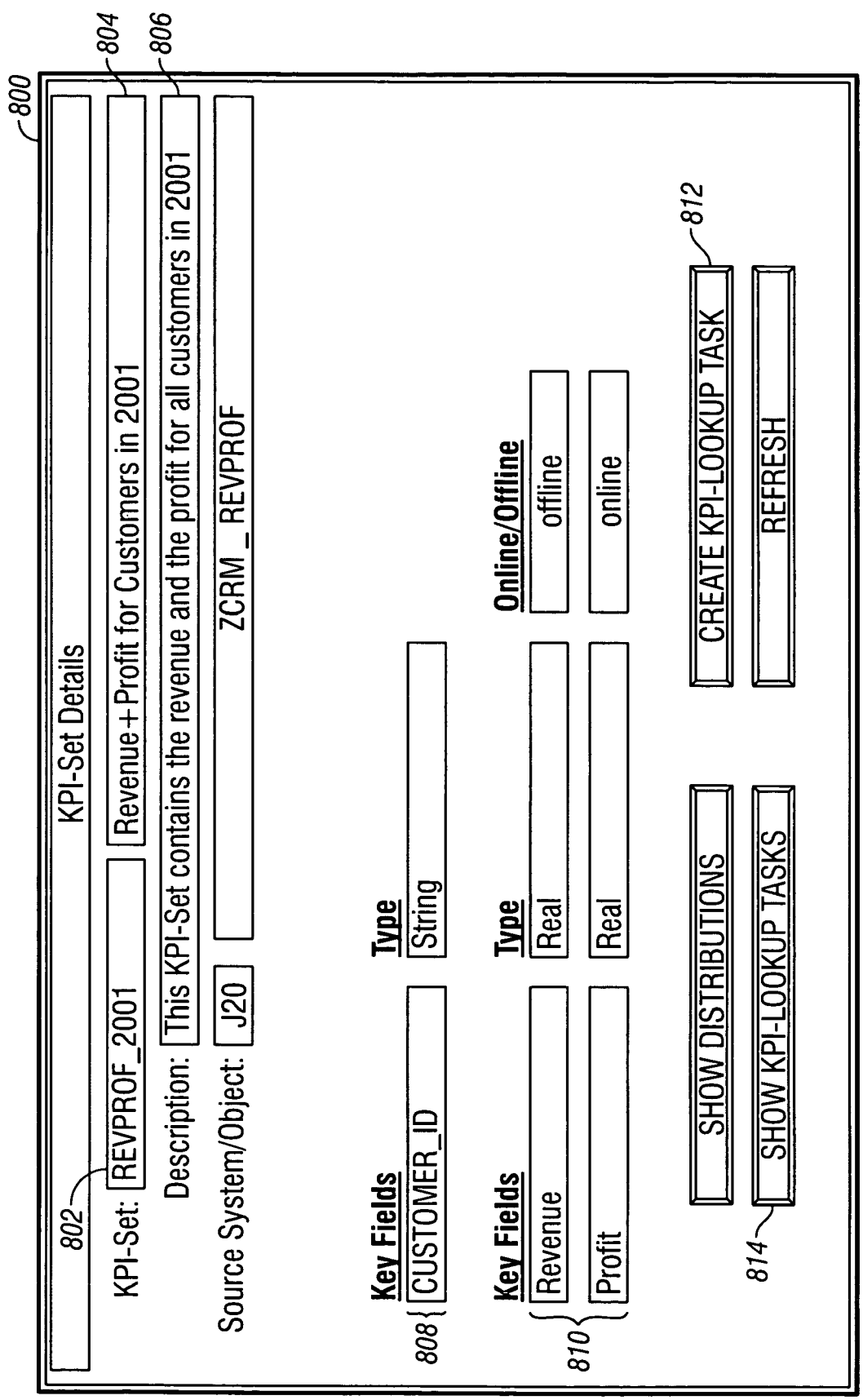
FIG. 8 is a screen display of KPI set details, according to one implementation of the invention.

FIG. 8 is a screen display of KPI set details, according to one implementation of the invention. In this implementation, screen display 800 shows the details of a KPI set definition. In one implementation, a creator (such as creator 240 shown in FIG. 2) manages the KPI set definition. In one implementation, the KPI set is stored in data warehouse 124 shown in FIG. 1A. An application is capable of accessing information in the KPI set by way of a KPI-lookup task.

In FIG. 8, screen display 800 contains a page having the details of a KPI set definition. Name field 802 indicates the name of the given KPI set. Name description field 804 provides a brief description of the KPI set. Description field 806 provides an additional description. In the example shown, the KPI set includes revenue and profile information for all customers in the year 2001. Key fields 808 are the key input fields used to access information within the KPI set. Each key field has a name and a type. As shown, the CUSTOMER_ID key field is a string, and is used as input. Each customer has a customer identifier that is designated by the CUSTOMER_ID. KPI fields 810 are then indexed and accessed using the CUSTOMER_ID. The two example KPI fields shown in FIG. 8 are revenue and profit. Each KPI field has a name, type, and online/offline designator. Both the revenue and profile KPI fields have values of type real (i.e., floating point). The online/offline designator indicates whether the KPI field for the KPI set is looked up online, or whether it is kept offline (e.g., in a local cache).

If button 814 is selected, all KPI-lookup tasks associated with the given KPI set will be displayed. If button 812 is selected, a new KPI-lookup task can be created in association with the given KPI set. This new KPI-lookup task would also be associated with the application that initiates the task.

FIG. 9 is a screen display of a KPI-lookup task, according to one implementation of the invention. In this implementation, screen display 900 shows a definition of a KPI-lookup task. In one implementation, an administrator, such as AAP administrator 200 in FIG. 2, may define a KPI-lookup task during KPI-lookup task definition 212. An application initiates a KPI-lookup task to obtain KPI set information, which may also be used as input for a prediction task. A system, such as AAP 110 shown in FIG. 1A, processes the information contained in the KPI-lookup task to help determine the logistics for executing the task. For example, AAP 110 is able to use the information provided in the KPI-lookup task to identify the KPI-set that is to be used in executing the task. AAP 110 is also able to identify the application and key fields that are used for task execution, and the pertinent value mappings between such fields.

In FIG. 9, screen display 900 shows a page for defining a KPI-lookup task. Task name field 902 indicates the name, or identification, of the KPI-lookup task. Button 904 may be selected to change the name of the task. In one implementation, a change button located in proximity to any field may be used to change the value of that field. Name description field 906 provides a brief description of the name of the KPI-lookup task. Application field 908 indicates the name of the application with which the KPI-lookup task is associated. In the example shown in FIG. 9, the Internet sales application, such as application 100 shown in FIG. 1A, is the associated application. In this example, the Internet sales application would initiate the KPI-lookup task. Application description field 910 provides a brief description of the application. KPI-set field 912 indicates the names of the KPI set that will be used for accessing data in response to the invocation of the KPI-lookup task by the application. The KPI-lookup task will access this KPI set to obtain the KPI information. KPI-set description field 914 provides a brief description of the KPI-set that is used.

Key fields 916 are the input fields used for accessing the KPI-set information as part of the KPI-lookup task. As shown in FIG. 9, the CUSTOMER_ID is the key field needed to access the KPI information, which is provided as output. To obtain the CUSTOMER_ID key field, the KPI-lookup task first processes the corresponding information from the application in application fields 920. As shown in FIG. 9, CUSTOMER is the application field that corresponds to the CUSTOMER_ID key field. The KPI-lookup task can use a mapping function to associate these two fields and map one value to another. Similarly, the KPI-lookup task is capable of associating output fields and the values generated from the KPI-lookup task. KPI fields 918 are associated with and mapped to output fields 922. KPI fields 918 (REVENUE, PROFIT) are the KPI-set output fields from the KPI-lookup task. They are obtained by processing the key fields 916 as input. These fields are then mapped to output fields 922, and the values for output fields 922 are then provided to the Internet sales application. Note that the KPI field of PROFIT has no corresponding output field used by the Internet sales application in the example shown in FIG. 9.

A number of implementations of the invention have been described. Nevertheless, it will be understood that various modifications may be made without departing from the spirit and scope of the invention. Accordingly, other embodiments are within the scope of the following claims.

What is claimed is:

1. A computer system that integrates front-end software applications with analytical software applications, the computer system including at least one processor and being programmed to:
receive at an analytical processing front-end application a request from a front-end software application performing a business transaction process, wherein:
the request is to execute an analytical task and includes a predefined task name and input information, and
the analytical processing front-end application being accessible to multiple front-end software applications;
use the predefined task name to identify, from predefined task definition information, an analytical engine and a data store, the analytical engine being one of multiple analytical engines accessible to the analytical processing front-end application;
invoke an analytical software application in the identified analytical engine to execute the analytical task, wherein the analytical task is executed using the identified data store and the received input information;
receive at the analytical processing front-end application task output from the invoked analytical software application, the task output including output information generated during execution of the analytical task; and
send the output information to the front-end software application that made the request.

2. The computer system of claim 1, wherein the computer system is further programmed to translate one or more values of the output information into one or more translated output values that are sent to the front-end software application.

3. The computer system of claim 1, wherein the analytical task is a prediction task, wherein the analytical engine is a prediction server, wherein the data store comprises a data mining model, and wherein the analytical software application is a prediction application.

4. The computer system of claim 3, wherein the computer system is further programmed to translate one or more values of the input information into one or more translated input values for use with the data mining model during execution of the prediction task.

5. The computer system of claim 3, wherein the data mining model is represented using the Predictive Modeling Markup Language (PMML).

6. The computer system of claim 1, wherein the analytical task is a key performance indicator (KPI) lookup task, wherein the analytical engine is a KPI server, wherein the data store comprises a KPI-set, and wherein the analytical software application is a KPI-lookup application.

7. The computer system of claim 6, wherein the computer system is further programmed to translate one or more values of the input information into one or more translated input values for use with the KPI-set during execution of the KPI-lookup task.

8. The computer system of claim 1, wherein the computer system is programmed to:
receive the request from the front-end software application through a business rule engine, the business rule engine operable to determine whether an event is to be triggered in the front-end software application; and
send the output information to the front-end software application through the business rule engine.

9. The computer system of claim 1, wherein the analytical engine is located externally from the computer system.

10. The computer system of claim 1, wherein the data store is located externally from the computer system.

11. A computer-implemented method for integrating front-end software applications with analytical software applications, the method comprising:
receiving at an analytical processing front-end application a request from a front-end software application performing a business transaction process, wherein:
the request is to execute an analytical task and includes a predefined task name and input information, and
the analytical processing front-end application being accessible to multiple front-end software applications;
using the predefined task name to identify, from predefined task definition information, an analytical engine and a data store, the analytical engine being one of multiple analytical engines accessible to the analytical processing front-end application;

invoking an analytical software application in the identified analytical engine to execute the analytical task, wherein the analytical task is executed using the identified data store and the received input information;

receiving at the analytical processing front-end application task output from the invoked analytical software application, the task output including output information generated during execution of the analytical task; and sending the output information to the front-end software application that made the request.

12. The computer-implemented method of claim 11, wherein the method further comprises:

translating one or more values of the output information into one or more translated output values that are sent to the front-end software application.

13. The computer-implemented method of claim 11, wherein the analytical task is a prediction task, wherein the analytical engine is a prediction server, wherein the data store comprises a data mining model, and wherein the analytical software application is a prediction application.

14. The computer-implemented method of claim 13, wherein the method further comprises:

translating one or more values of the input information into one or more translated input values for use with the data mining model during execution of the prediction task.

15. The computer-implemented method of claim 13, wherein the data mining model is represented using the Predictive Modeling Markup Language (PMML).

16. The computer-implemented method of claim 11, wherein the analytical task is a key performance indicator (KPI) lookup task, wherein the analytical engine is a KPI server, wherein the data store comprises a KPI-set, and wherein the analytical software application is a KPI-lookup application.

17. The computer-implemented method of claim 16, wherein the method further comprises:

translating one or more values of the input information into one or more translated input values for use with the KPI-set during execution of the KPI-lookup task.

18. The computer-implemented method of claim 11, wherein:

receiving the request from the front-end software application includes receiving the request from the software application through a business rule engine, the business rule engine operable to determine whether an event is to be triggered in the front-end software application; and sending the output information to the front-end software application includes sending the output information to the software application through the business rule engine.

19. A computer-readable medium having computer-executable instructions contained therein for performing a method, the method comprising:

receiving at an analytical processing front-end application a request from a front-end software application performing a business transaction process, wherein:

the request is to execute an analytical task and includes a predefined task name and input information, and the analytical processing front-end application being accessible to multiple front-end software applications;

using the predefined task name to identify, from predefined task definition information, an analytical engine and a data store, the analytical engine being one of multiple analytical engines accessible to the analytical processing front-end application;

invoking an analytical software application in the identified analytical engine to execute the analytical task, wherein the analytical task is executed using the identified data store and the received input information;

receiving at the analytical processing front-end application task output from the invoked analytical software application, the task output including output information generated during execution of the analytical task; and sending the output information to the front-end software application that made the request.

* * * * *